United States Patent
Lu et al.

(10) Patent No.: US 8,508,509 B2
(45) Date of Patent: Aug. 13, 2013

(54) OPTICAL TOUCH DISPLAY DEVICE

(75) Inventors: Chih-Hung Lu, Hsinchu (TW);
Wei-Chung Wang, Hsinchu (TW);
Hui-Hsuan Chen, Hsinchu (TW)

(73) Assignee: Pixart Imaging Inc., Hsinchu (TW)

( * ) Notice: Subject to any disclaimer, the term of this patent is extended or adjusted under 35 U.S.C. 154(b) by 230 days.

(21) Appl. No.: 12/916,835

(22) Filed: Nov. 1, 2010

(65) Prior Publication Data

US 2011/0261015 A1    Oct. 27, 2011

(30) Foreign Application Priority Data

Apr. 21, 2010  (TW) ............................... 99112534 A
Jul. 14, 2010  (TW) ............................... 99123164 A (51) Int. Cl.
*G06F 3/042* (2006.01)
(52) U.S. Cl.
USPC ...................................................... 345/175
(58) Field of Classification Search
USPC ............................................... 345/173, 175
See application file for complete search history.

(56) References Cited

U.S. PATENT DOCUMENTS

| | | | |
|---|---|---|---|
| 4,868,912 A | 9/1989 | Doering | |
| 2006/0279558 A1 | 12/2006 | Van Delden et al. | |
| 2008/0007540 A1 | 1/2008 | Ostergaard | |
| 2010/0045634 A1 | 2/2010 | Su et al. | |
| 2010/0214269 A1* | 8/2010 | Wang et al. | 345/175 |
| 2010/0295821 A1* | 11/2010 | Chang et al. | 345/175 |
| 2011/0001727 A1* | 1/2011 | Ko et al. | 345/175 |

FOREIGN PATENT DOCUMENTS

| | | |
|---|---|---|
| CN | 1853160 | 10/2006 |
| CN | 1991968 | 7/2007 |
| CN | 101424993 | 5/2009 |
| TW | M363032 | 8/2009 |
| TW | 201009671 | 3/2010 |

* cited by examiner

*Primary Examiner* — Kevin M Nguyen
(74) *Attorney, Agent, or Firm* — WPAT, PC; Justin King (57) ABSTRACT

An optical touch device includes a display panel and at least a light emitting and receiving unit. The display panel includes a transparent substrate having a touch surface and a plurality of side surfaces adjacent to the touch surface. At least one of the side surfaces is a first light incidence surface and at least one of the side surfaces is a first light emitting surface. Each light emitting and receiving unit includes a linear light source and a light sensing component. The linear light source is disposed beside the first light incidence surface and is configured for providing optical signals into the transparent substrate. The light sensing component is disposed beside the first light emitting surface. The light sensing component is configured for receiving the optical signals from the linear light source. The optical touch display device has advantages of low cost.

19 Claims, 8 Drawing Sheets

OPTICAL TOUCH DISPLAY DEVICE

FIELD OF THE INVENTION

The present invention relates to a touch display device, and more particularly to an optical touch display device.

BACKGROUND OF THE INVENTION

A touch display device has an advantage of easy operation. Recently, the touch display device has been widely applied to various electronic products, for example, mobile phones, personal digital assistants (PDAs), digital cameras, music players, computers, satellite navigation devices, touch screens, and so on.

The touch display device includes a display panel and a touch unit. Generally, a familiar type of the touch unit is, for example, a resistive touch unit or a capacitive touch unit. However, the resistive touch unit or the capacitive touch unit has a high cost.

SUMMARY OF THE INVENTION

The present invention provides an optical touch display device with a low cost and a thin thickness.

The present invention provides an optical touch display device with a low cost.

To achieve at least one of the above-mentioned advantages, the present invention provides an optical touch display device including a display panel and at least a light emitting and receiving unit. The display panel is configured for displaying an image. The display panel includes a transparent substrate. The image is capable of being seen through the transparent substrate. The transparent substrate has a touch surface and a plurality of side surfaces adjacent to the touch surface. At least one of the side surfaces is a first light incidence surface and at least one of the side surfaces is a first light emitting surface opposite to the first light incidence surface. Each light emitting and receiving unit includes a linear light source and a light sensing component. The linear light source is disposed beside the first light incidence surface of the transparent substrate and is configured for providing a plurality of optical signals into the transparent substrate through the first light incidence surface. The light sensing component is disposed beside the first light emitting surface. The light sensing component and the linear light source are respectively disposed at two opposite sides of the transparent substrate. The light sensing component is configured for receiving the optical signals from the linear light source.

In one embodiment provided by the present invention, the linear light source includes a light guide plate, a light emitting component and a shell. The light guide plate has a second light incidence surface and a second light emitting surface adjacent to the second light incidence surface, and the second light emitting surface faces to the first light incidence surface. The light emitting component is disposed beside the second light incidence surface. The shell is configured for receiving the light guide plate and the light emitting component. The light guide plate is configured for guiding a portion of the optical signals directly provided by the light emitting component and a portion of the optical signals reflected by the shell to the first light incidence surface.

In one embodiment provided by the present invention, the light emitting component includes an infrared light emitting component.

In one embodiment provided by the present invention, the light emitting component includes a light emitting diode.

In one embodiment provided by the present invention, the light sensing component includes a complementary metal oxide semiconductor (CMOS) image sensor or a charge coupled device (CCD).

In one embodiment provided by the present invention, each light emitting and receiving unit further includes a first reflecting member. The first reflecting member is disposed between the light sensing component and the first light emitting surface and is configured for reflecting the optical signals to the light sensing component.

In one embodiment provided by the present invention, the first reflecting member of each light emitting and receiving unit includes a first prism. The first prism has a third light incidence surface, a reflecting surface and a third light emitting surface. The third light incidence surface faces to the first light emitting surface. The third light emitting surface faces to the light sensing component. The reflecting surface is adjacent to and between the third light incidence surface and the third light emitting surface.

In one embodiment provided by the present invention, each light emitting and receiving unit further includes a first refracting member. The first refracting member is disposed between the first reflecting member and the first light emitting surface and is configured for refracting the optical signals to the first reflecting member.

In one embodiment provided by the present invention, each light emitting and receiving unit further includes a second reflecting member. The second reflecting member is disposed between the linear light source and the first light incidence surface and is configured for reflecting the optical signals to the first light incidence surface.

In one embodiment provided by the present invention, the second reflecting member of each light emitting and receiving unit includes a second prism. The second prism has a fourth light incidence surface, a reflecting surface and a fourth light emitting surface. The fourth light incidence surface faces to the linear light source. The fourth light emitting surface faces to the first light incidence surface. The reflecting surface is adjacent to and between the fourth light incidence surface and the fourth light emitting surface.

In one embodiment provided by the present invention, each light emitting and receiving unit further includes a second refracting member. The second refracting member is disposed between the second reflecting member and the first light incidence surface and is configured for refracting the optical signals to the first light incidence surface.

In one embodiment provided by the present invention, the display panel is selected from a group consisting of a liquid crystal display panel, an electrophoretic display panel, a plasma display panel, an organic light emitting diode display panel.

In one embodiment provided by the present invention, the optical touch display device further includes two reflecting layers respectively formed on the touch surface and a surface opposite to the touch surface. The reflecting layers are configured for reflecting the optical signals outside a light wavelength range of visible light.

In one embodiment provided by the present invention, the reflecting layers are configured for reflecting infrared optical signals.

In one embodiment provided by the present invention, the display panel includes a first substrate, a second substrate and a display layer disposed between the first substrate and the second substrate, and the second substrate is the transparent substrate.

In one embodiment provided by the present invention, the optical signals provided by the linear light source are totally reflected in the transparent substrate. When a touch member touches the touch surface, a portion of the optical signals is not totally reflected due to the touch member so that a location of the touch member is sensed by the light sensing component.

To achieve at least one of the above-mentioned advantages, the present invention also provides an optical touch display device including a display panel, a transparent substrate and at least a light emitting and receiving unit. The display panel is configured for displaying an image and includes a first substrate, a second substrate and a display layer disposed between the first substrate and the second substrate. The transparent substrate is disposed on the second substrate, and the image is capable of being seen through the transparent substrate. The transparent substrate includes a touch surface and a plurality of side surfaces adjacent to the touch surface. At least one of the side surfaces is a light incidence surface and at least one of the side surfaces is a light emitting surface opposite to the light incidence surface. Each light emitting and receiving unit includes a linear light source and a light sensing component. The linear light source is disposed beside the light incidence surface of the transparent substrate and is configured for providing a plurality of optical signals into the transparent substrate through the light incidence surface. The light sensing component is disposed beside the light emitting surface. The light sensing component and the linear light source are respectively disposed at two opposite sides of the transparent substrate. The light sensing component is configured for receiving the optical signals from the linear light source.

In the optical touch display devices of embodiments of the present invention, the light emitting and receiving unit with a low cost is applied to achieve the touch function, so the optical touch display device has advantages of low cost. In one embodiment, because the transparent substrate of the display panel of the optical touch display device is served as a transferring medium of the optical signals, an additional transparent substrate is not needed. Thus, a thickness of the optical touch display device is reduced.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
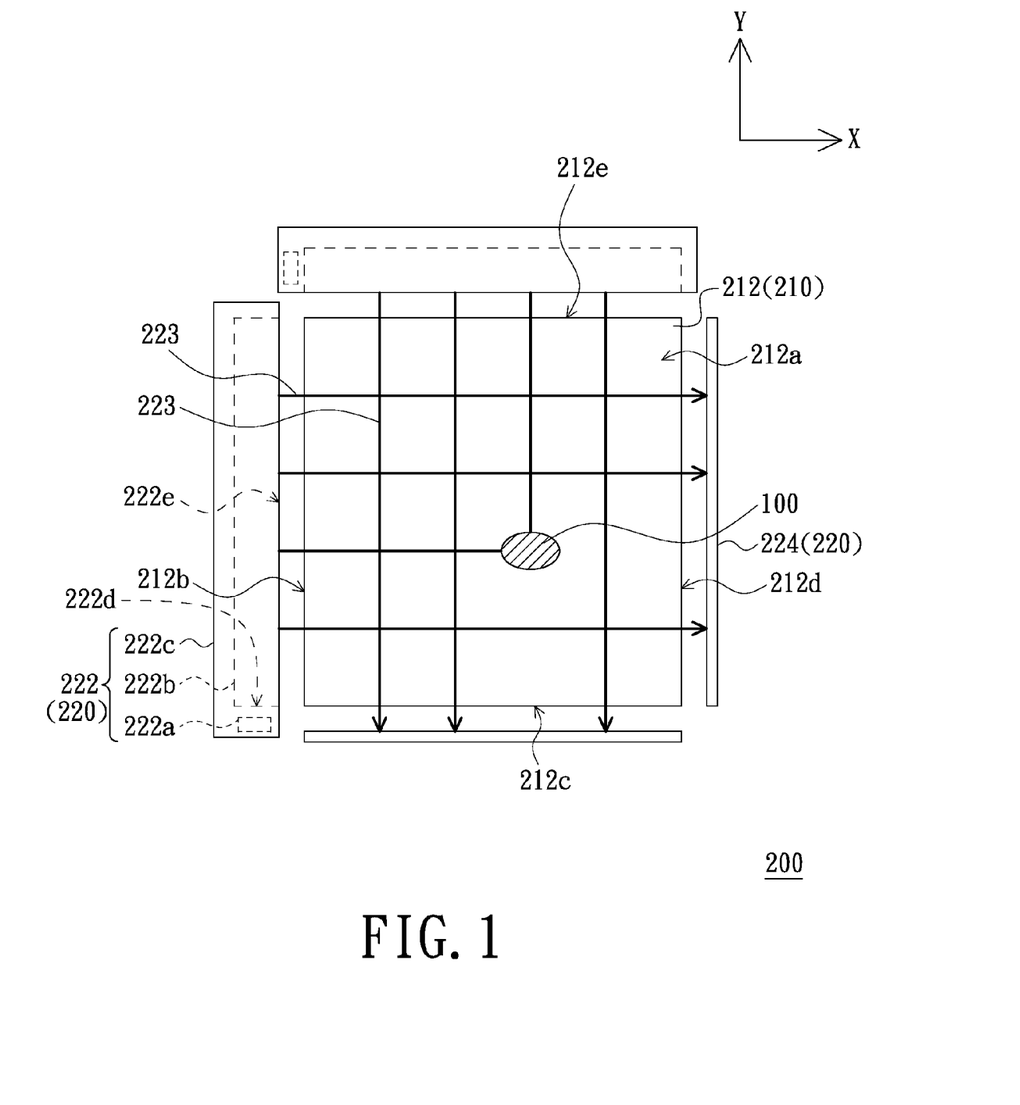
FIG. 1 is a schematic, top view of an optical touch display device in accordance with an embodiment of the present invention.
Figure 2:
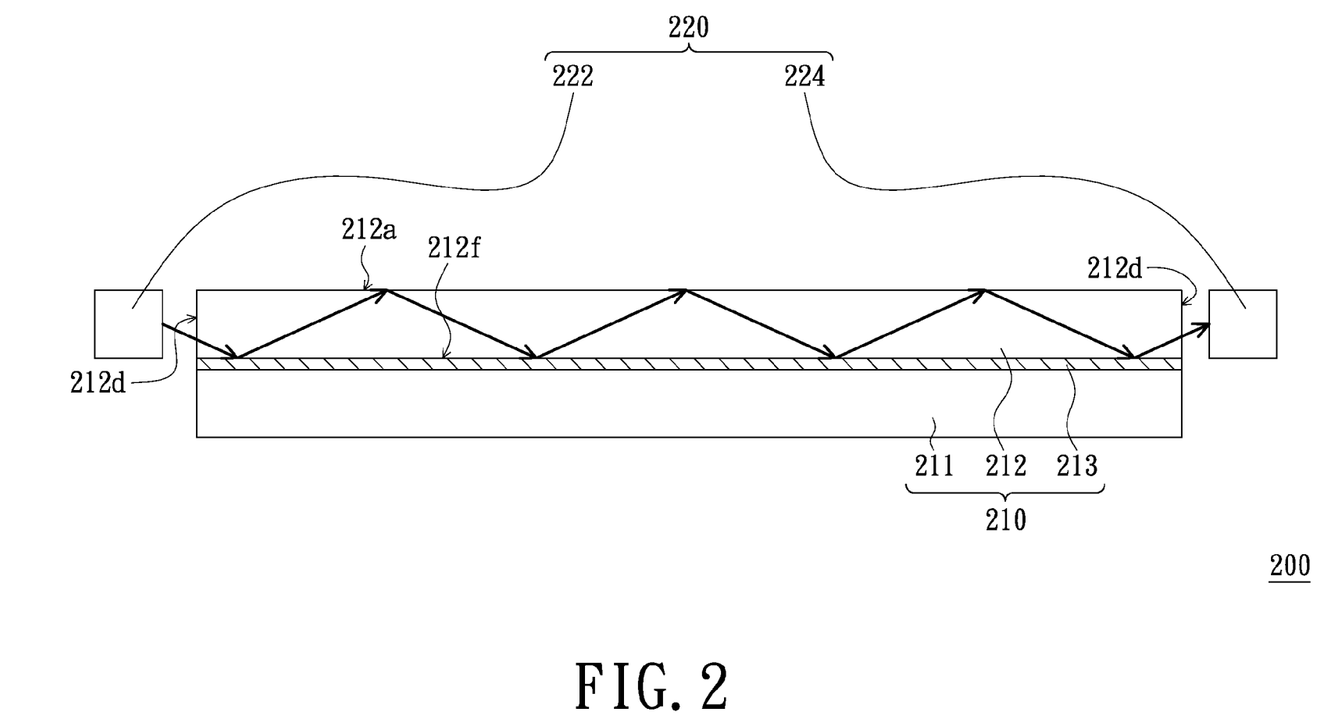
FIG. 2 is a schematic, cross-sectional view of the optical touch display device as shown in FIG. 1.

FIG. 1 is a schematic, top view of an optical touch display device in accordance with an embodiment of the present invention. FIG. 2 is a schematic, cross-sectional view of the optical touch display device as shown in FIG. 1. Referring to FIG. 1 and FIG. 2, in the present embodiment, an optical touch display device 200 includes a display panel 210 and at least a light emitting and receiving unit 220. Two light emitting and receiving units 220 are, for example, shown in FIG. 1.

The display panel 210 is configured for displaying an image. The display panel 210 includes a transparent substrate 212. The image can be seen through the transparent substrate 212. The transparent substrate 210 has a touch surface 212a and a plurality of side surfaces (e.g. the side surfaces 212b, 212c, 212d, 212e) adjacent to the touch surface 212a. At least one of the side surfaces 212b, 212c, 212d, 212e is a first light incidence surface and at least one of the side surfaces 212b, 212c, 212d, 212e is a first light emitting surface opposite to the first light incidence surface. In the embodiment, the number of the first light incidence surface and the number of the first light emitting surface respectively correspond to the number of the light emitting and receiving units 220. In the present embodiment, because the optical touch display device 200 includes the two light emitting and receiving units 220, the number of the first light incidence surface and the number of the first light emitting surface are respectively two. In the present embodiment, the side surfaces 212b, 212e are the first light incidence surfaces, and the side surfaces 212c, 212d are the first light emitting surfaces. The side surfaces 212b, 212e are called the first light incidence surfaces 212b, 212e and the side surfaces 212c, 212d are called the first light emitting surfaces 212c, 212d in the following description. In addition, the display panel 210 includes, for example, a first substrate 211, a second substrate (i.e., the transparent substrate 212) and a display layer 213 between the first substrate 211 and the transparent substrate 212. The display panel 210 can be a liquid crystal display panel, an electrophoretic display panel, a plasma display panel, an organic light emitting diode display panel or other display panel.

Each light emitting and receiving unit 220 includes a linear light source 222 and a light sensing component 224. In the present embodiment, the linear light sources 222 are respectively disposed beside the first light incidence surfaces 212b, 212c of the transparent substrate 212 and are configured for providing a plurality of optical signals 223 into the transparent substrate 212 through the first light incidence surfaces 212b, 212e. The light sensing components 224 are respectively disposed beside the first light emitting surfaces 212c, 212d. The linear light source 222 and the light sensing component 224 of each light emitting and receiving unit 220 are respectively disposed at two opposite sides of the transparent substrate 212. In each light emitting and receiving unit 220, the light sensing component 224 is configured for receiving the optical signals 223 from the corresponding linear light source 222.

Each linear light source 222 includes, for example, a light emitting component 222a, a light guide plate 222b and a shell 222c. Each light guide plate 222b has a second light incidence surface 222d and a second light emitting surface 222e adjacent to the second light incidence surface 222d. The second light emitting surfaces 222e face to the first light incidence surfaces 212b, 212e respectively. The light emitting components 222a are respectively disposed beside the second light incidence surfaces 222d. The shell 222c receives the corresponding light guide plate 222b and the corresponding light emitting component 222a therein. The light emitting components 222a are, for example, infrared light emitting components. In the present embodiment, the light emitting components 222a can be, but not limited to, light emitting diodes. Additionally, the light guide plates 222b are configured for guiding the optical signals 223 directly provided by the light emitting components 222a and the optical signals 223 reflected by the shells 222c to the first light incidence surfaces 212b, 212e.

In general, when the touch surface 212a of the transparent substrate 212 is not touched by a touch member (i.e., a finger), the touch surface 212a is contacted with air. After the optical signals 223 from the linear light source 222 enter into the transparent substrate 212 through the first light incidence surfaces 212b, 212e, the total reflections of the optical signals 223 are occurred in the transparent substrate 212. Then, the optical signals 223 are emitted from the first light emitting surfaces 212c, 212d to be sensed by the light sensing components 224. The forward direction of the optical signals 223 from one of the two linear light sources 222 is, for example, parallel to an X axis, and the forward direction of the optical signals 223 from the other of the two linear light sources 222 is, for example, parallel to a Y axis. Additionally, when a touch member 100 (e.g., a finger, a pen or other objects) touches the touch surface 212a, a portion of the optical signals 223 arriving at the portion of the touch surface 212a touched by the touch member 100 can not be sensed by the light sensing components 224. More specifically, because the refraction index of the touch member 100 is greater than the refraction index of the air, the portion of the optical signals 223 can not be totally reflected. Thus, a location of the touch member 100 can be obtained according to the location of the portion of the optical signals 223 that is not sensed by the light sensing components 224. In other words, when the touch member 100 touches the touch surface 212a, the total reflections of the portion of the optical signals 223 do not occurred. Thus, a portion of the sensing region of each light sensing component 224 can not sense the optical signals 223 and the location of the touch member 100 can be obtained according to the sensing region of each light sensing component 224 that do not sense the optical signals 223.

In the present embodiment, each light sensing component 224 can be a CMOS image sensor, a CCD, or other suitable light sensing component. In addition, the light sensing component 224 beside the first light emitting surface 212c can sense the location of the touch member 100 along the X axis, and the light sensing component 224 beside the first light emitting surface 212d can sense the location of the touch member 100 along the Y axis. Therefore, the two light sensing components 224 can sense the right location of the touch member 100 located on the touch surface 212.

In the present embodiment, the optical touch display device 200 achieves the touch function in an optically sensing manner. The light emitting and receiving unit 220 has a lower cost than the resistive touch unit or the capacitive touch unit, which is an advantage of the optical touch display device 200. Additionally, in the present embodiment, because the transparent substrate 212 of the display panel 210 of the optical touch display device 200 is served as a transferring medium of the optical signals, an additional transparent substrate is not needed. Thus, a thickness of the optical touch display device 200 is reduced.

It is noted that, the optical touch display device 200 includes, but not limited to, the two light emitting and receiving units 220. In another embodiment, the optical touch display device can includes one light emitting and receiving unit 220 or more than two the light emitting and receiving units 220 according to the demand. In addition, in order to increase the reflectivity of the optical signals 223, two reflecting layers (not shown) can be respectively formed on the touch surface 212a and a surface 212f opposite to the touch surface 212a. Because the image displayed by the display panel 210 is comprised of visible light, the reflecting layers are configured for reflecting the optical signals outside the light wavelength range of the visible light. For example, in one embodiment, when the light emitting components 222a are the infrared light emitting components, the reflecting layers are configured for reflecting the infrared optical signals.

Figure 3:
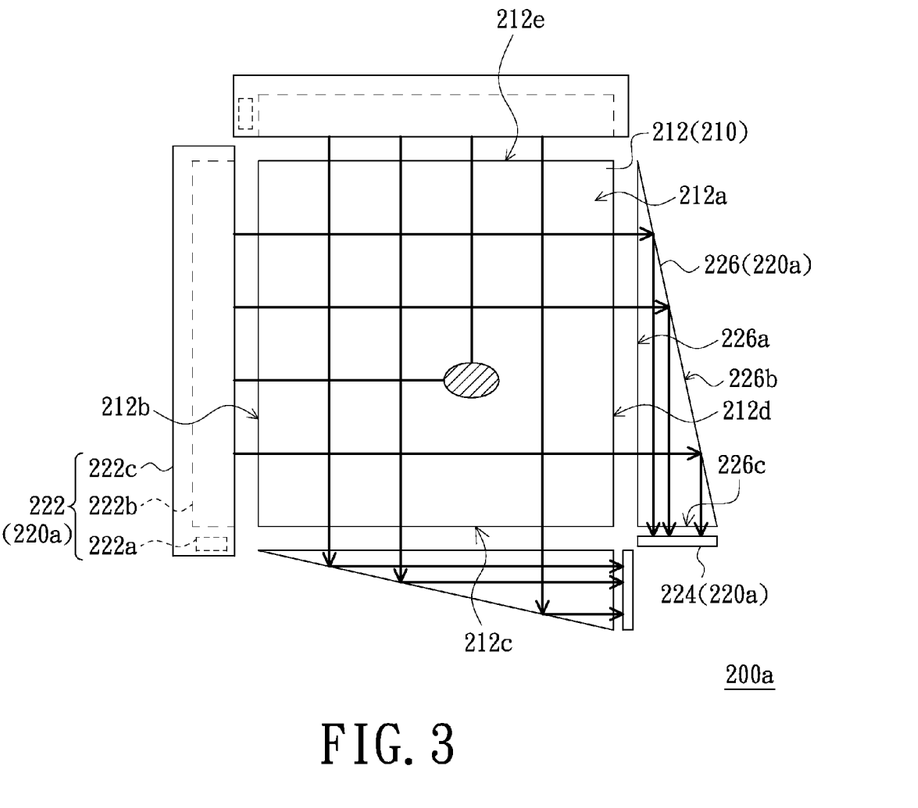
FIG. 3 is a schematic, top view of an optical touch display device in accordance with another embodiment of the present invention.

FIG. 3 is a schematic, top view of an optical touch display device in accordance with another embodiment of the present invention. Referring to FIG. 3, in the present embodiment, the optical touch display device 200a is similar to the optical touch display device 200 except that each light emitting and receiving unit 220a of the optical touch display device 200a further includes a first reflecting member 226. Each reflecting member 226 is disposed between the light sensing component 224 and the corresponding first light emitting surface 212c/212d. Additionally, each first reflecting member 226 is, for example, a first prism, and is configured for reflecting the optical signals 223 to the light sensing component 224. The first prism includes a third light incidence surface 226a, a reflecting surface 226b and a third light emitting surface 226c. The third light incidence surface 226a faces to the corresponding first light emitting surface 212c/212d. The third light emitting surface 226c faces to the corresponding light sensing component 224. The reflecting surface 226b is adjacent to and between the third light emitting surface 226c and the third light incidence surface 226a.

Figure 4:
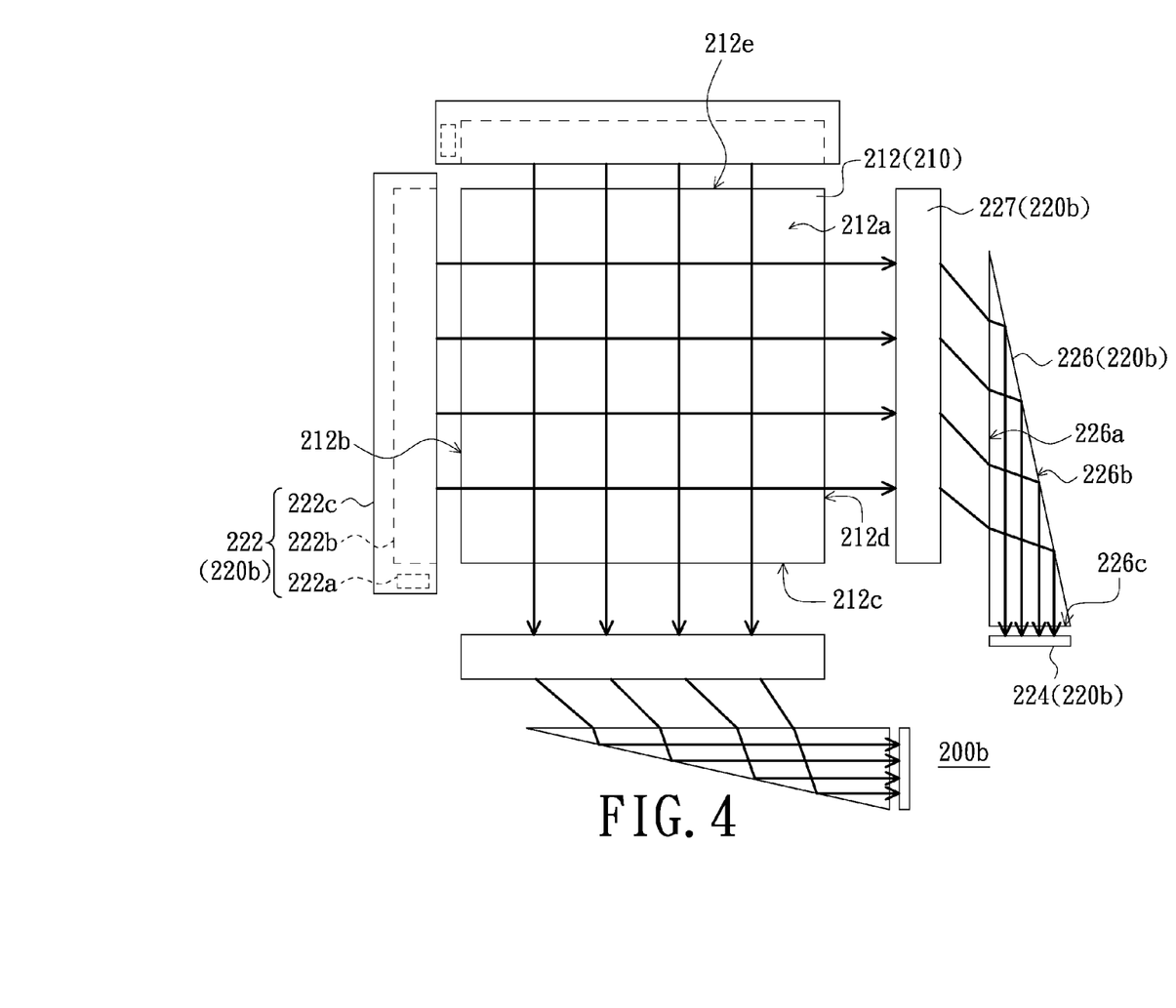
FIG. 4 is a schematic, top view of an optical touch display device in accordance with still another embodiment of the present invention.

FIG. 4 is a schematic, top view of an optical touch display device in accordance with still another embodiment of the present invention. Referring to FIG. 4, in the present embodiment, the optical touch display device 200b is similar to the optical touch display device 200a except that each light emitting and receiving unit 220b of the optical touch display device 200b further includes a first refracting member 227. The first refracting member 227 is disposed between the first reflecting member 226 and the corresponding first light emitting surface 212c/212d, and is configured for refracting the optical signals 223 to the first reflecting member 226. In addition, in FIG. 4, the first refracting member 227 is not contacted with the first reflecting member 226. In another embodiment, the first refracting member 227 can be contacted with the third light incidence surface 226a of the first reflecting member 226.

Figure 5:
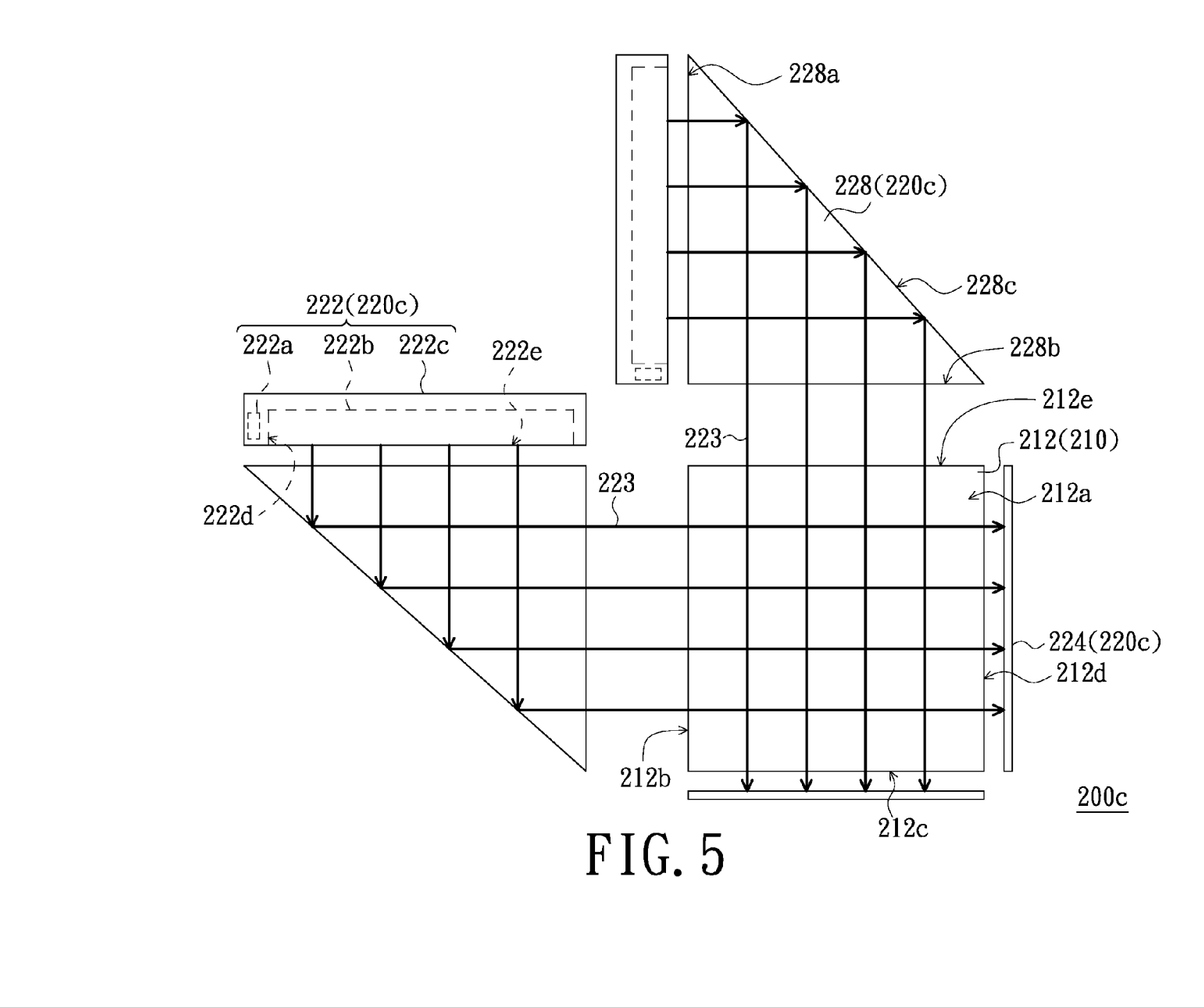
FIG. 5 is a schematic, top view of an optical touch display device in accordance with further another embodiment of the present invention.

FIG. 5 is a schematic, top view of an optical touch display device in accordance with further another embodiment of the present invention. Referring to FIG. 5, in the present embodiment, an optical touch display device 200c is similar to the optical touch display device 200 except that each light emitting and receiving unit 220c of the optical touch display device 200c further includes a second reflecting member 228. The second reflecting member 228 is located between the linear light source 222 and the corresponding first light incidence surface 212b/212e, and is configured for reflecting the optical signals 223 to the corresponding first light incidence surface 212b/212e. In the present embodiment, the second reflecting member 228 is, for example, a second prism. The second prism includes a fourth light incidence surface 228a, a reflecting surface 228b and a fourth light emitting surface 228c. The fourth light incidence surface 228a faces to the corresponding linear light source 222, and the fourth light emitting surface 228c faces to the first light incidence surface 212b/212e. The reflecting surface 228b is adjacent to and between the fourth light emitting surface 228c and the fourth light incidence surface 228a.

Figure 6:
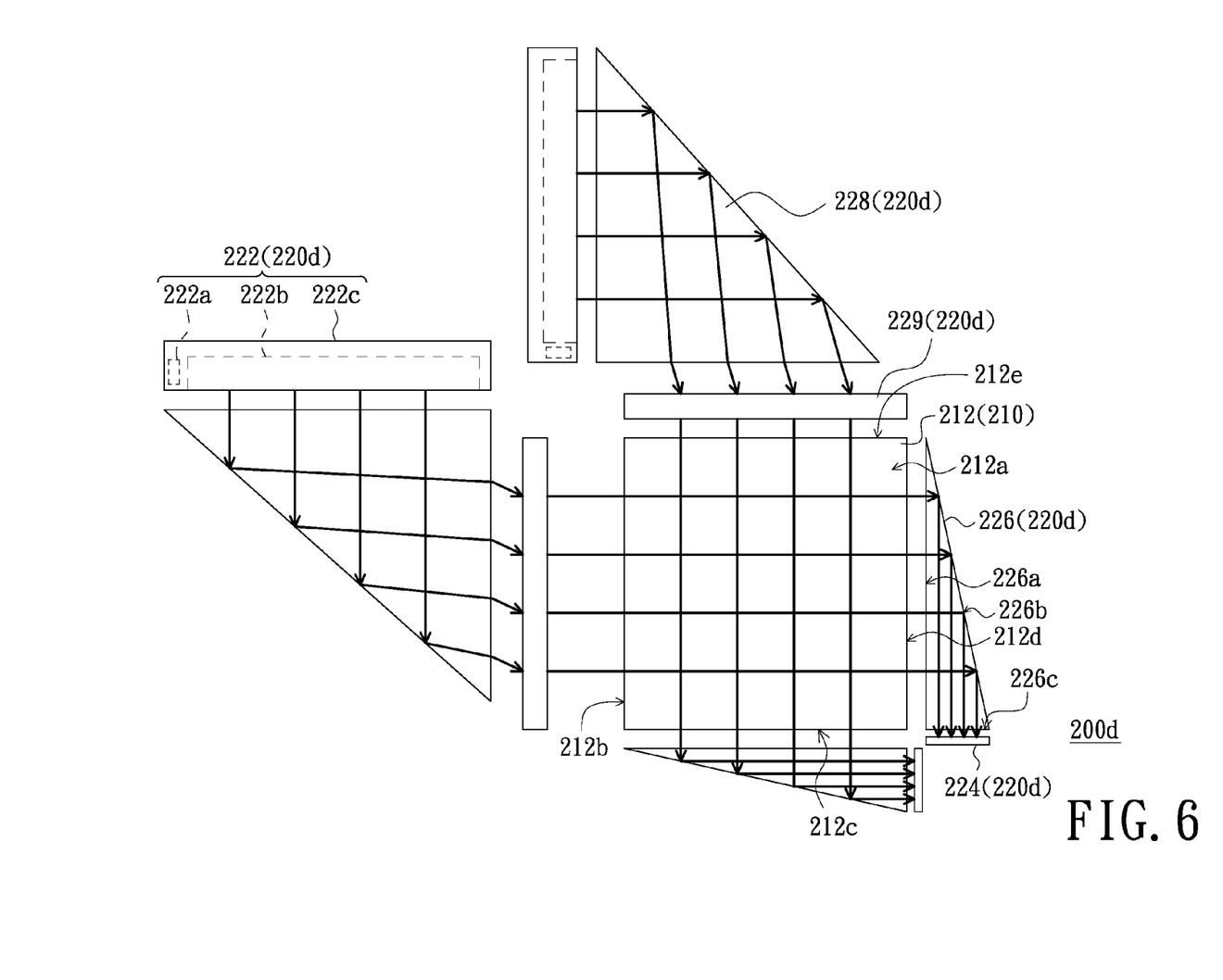
FIG. 6 is a schematic, top view of an optical touch display device in accordance with yet another embodiment of the present invention.

FIG. 6 is a schematic, top view of an optical touch display device in accordance with yet another embodiment of the present invention. Referring to FIG. 6, an optical touch display device 200d is similar to the optical touch display device 200c except that each light emitting and receiving unit 220d of the optical touch display device 200d further includes a second refracting member 229. The second refracting member 229 is disposed between the second reflecting member 228 and the corresponding first light incidence surface 212b/212e, and is configured for refracting the optical signals 223 to the corresponding first light incidence surface 212b/212e. In addition, in FIG. 6, the second refracting member 229 is not contacted with the second reflecting member 228. In another embodiment, the second refracting member 229 can be contacted with the fourth light incidence surface 228a of the second reflecting member 228.

The optical touch display devices 200a, 200b, 200c and 200d have advantages similar to the optical touch display device 200 and are not described here.

Figure 7:
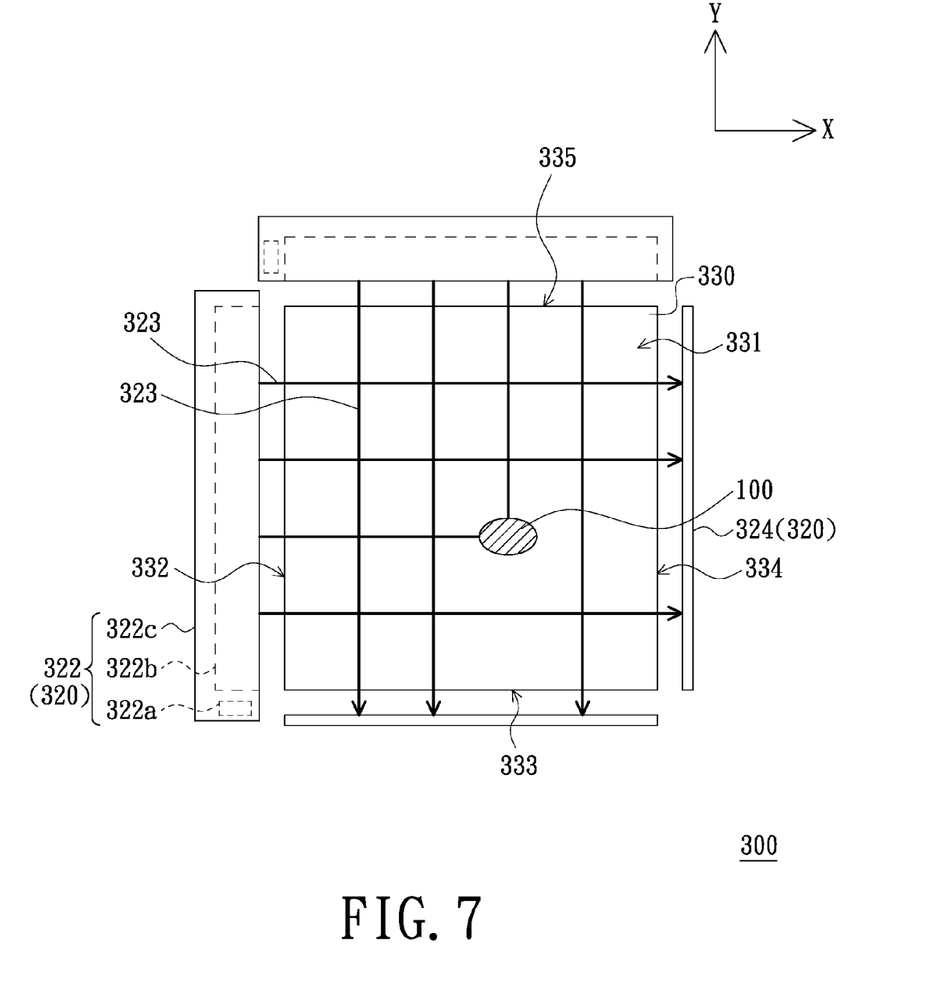
FIG. 7 is a schematic, top view of an optical touch display device in accordance with even another embodiment of the present invention.
Figure 8:
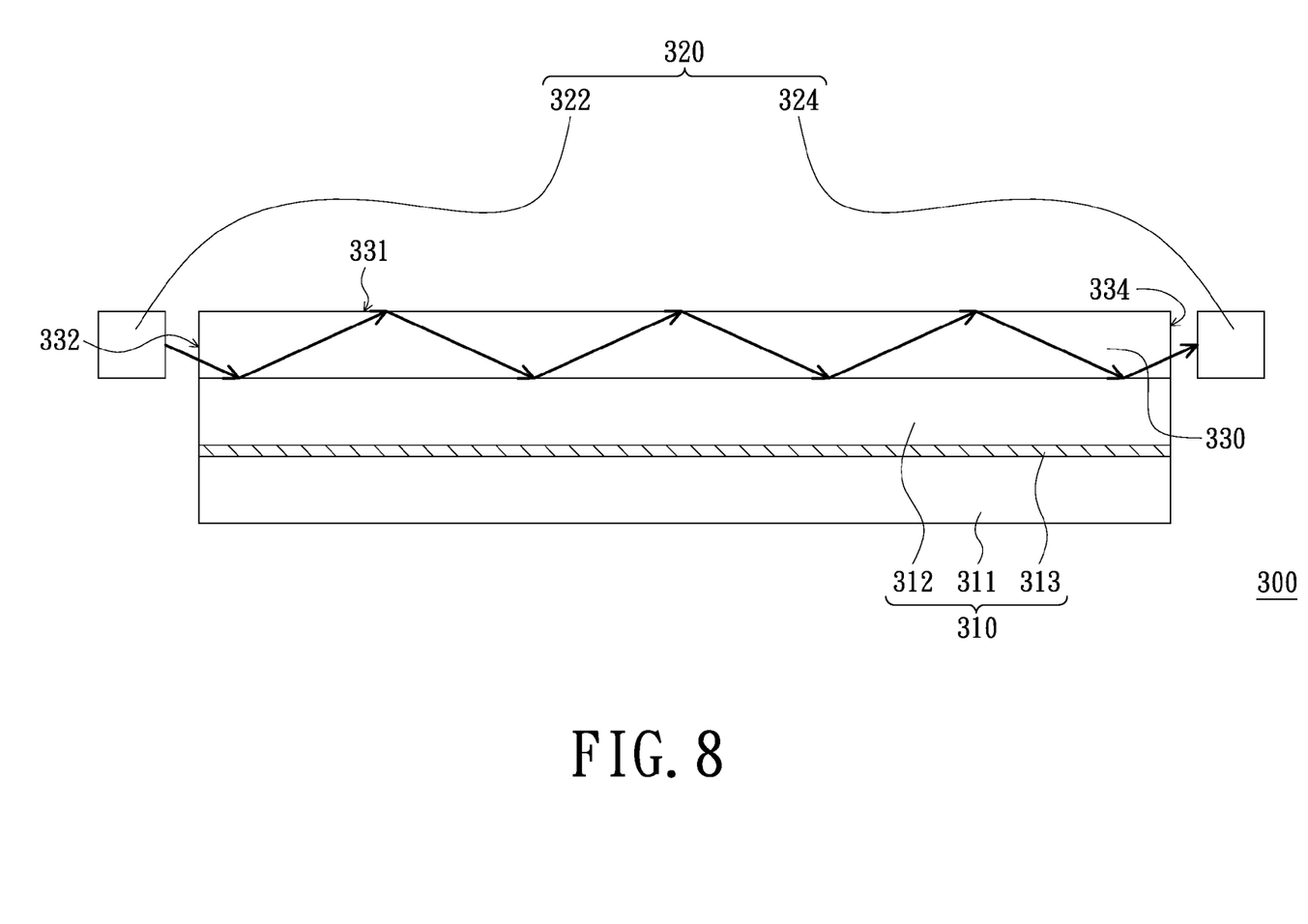
FIG. 8 is a schematic, cross-sectional view of the optical touch display device as shown in FIG. 7.

FIG. 7 is a schematic, top view of an optical touch display device in accordance with even another embodiment of the present invention. FIG. 8 is a schematic, cross-sectional view of the optical touch display device as shown in FIG. 7. Referring to FIG. 7 and FIG. 8, in the present embodiment, the optical touch display device 300 includes a display panel 310, at least a light emitting and receiving unit 320 and a transparent substrate 330. Two light emitting and receiving units 320 are, for example, shown in FIG. 7. The display panel 310 is configured for displaying an image, and includes a first substrate 311, a second substrate 312 and a display layer 313 disposed between the first substrate 311 and the second substrate 312. The transparent substrate 330 is disposed on the second substrate 312 of the display panel 310. The transparent substrate 330 has a touch surface 331 and a plurality of side surfaces (e.g. the side surfaces 332, 333, 334, 335) adjacent to the touch surface 331. At least one of the side surfaces 332, 333, 334, 335 is a light incidence surface and at least one of the side surfaces 332, 333, 334, 335 is a light emitting surface opposite to the light incidence surface. In the embodiments, the number of the light incidence surface and the number of the light emitting surface respectively correspond to the number of the light emitting and receiving units 320. In the present embodiment, because the optical touch display device 300 includes the two light emitting and receiving units 320, the number of the light incidence surface and the number of the light emitting surface are respectively two. In the present embodiment, the side surfaces 332, 335 are light incidence surfaces, and the side surfaces 333, 334 are light emitting surfaces. The side surfaces 332, 335 are called the light incidence surfaces 332, 335 and the side surfaces 333, 334 are called the light emitting surfaces 333, 334 in the following description.

Each light emitting and receiving unit 320 includes a linear light source 322 and a light sensing component 324. In the present embodiment, the linear light sources 322 are respectively disposed beside the light incidence surfaces 332, 335 of the transparent substrate 330 and are configured for providing a plurality of optical signals 323 into the transparent substrate 330 through the light incidence surfaces 332, 335. The light sensing components 324 are respectively disposed beside the light emitting surfaces 333, 334 of the transparent substrate 330. The linear light source 322 and the light sensing component 324 of each light emitting and receiving unit 320 are respectively disposed at two opposite sides of the transparent substrate 330. The light sensing components 324 each are configured for receiving the optical signals 323 from the corresponding linear light source 322.

Each linear light source 322 includes, for example, a light emitting component 322a, a light guide plate 322b and a shell 322c. Each linear light source 322 is similar to the linear light source 222 and is not described here.

In general, when the touch surface 331 of the transparent substrate 330 is not touched by the touch member (i.e., the finger), the touch surface 331 is contacted with air. After the optical signals 323 from the linear light source 322 enter into the transparent substrate 330 through the light incidence surfaces 332, 335, the total reflections of the optical signals 323 are occurred in the transparent substrate 330. Then, the optical signals 323 are emitted from the light emitting surfaces 333, 334 to be sensed by the corresponding light sensing components 324. The forward direction of the optical signals 323 from one of the two linear light sources 322 is, for example, parallel to an X axis, and the forward direction of the optical signals 323 from the other of the two linear light sources 322 is, for example, parallel to a Y axis. Additionally, when the touch member 100 (e.g., a finger, a pen or other object) touches the touch surface 331, a portion of the optical signals 323 arriving at a portion of the touch surface 331 touched by the touch member 100 can not be sensed by the light sensing components 324. More specifically, because the refraction index of the touch member 100 is greater than the refraction index of the air, the portion of the optical signals 323 can not be totally reflected. Thus, the location of the touch member 100 can be obtained according to the location of the sensing regions where the portion of the optical signals 323 is not sensed by the light sensing components 324. In other words, when the touch member 100 touches the touch surface 331, the total reflections of the portion of the optical signals 323 do not occurred. Thus, the portion of the sensing region of each light sensing component 324 can not sense the optical signals 323 and the location of the touch member 100 can be obtained according to the sensing region of each light sensing component 324 that do not sense the optical signals 323.

In the present embodiment, each light sensing component 324 can be a CMOS image sensor, a CCD, or other suitable light sensing component. In addition, the light sensing component 324 beside the light emitting surface 333 can sense the location of the touch member 100 along the X axis, and the light sensing component 324 beside the light emitting surface 334 can sense the location of the touch member 100 along the Y axis. Therefore, the two light sensing components 324 can sense the right location of the touch member 100 located on the touch surface 331.

In the present embodiment, the optical touch display device 300 achieves the touch function in an optically sensing manner. The light emitting and receiving unit 320 has a lower cost than the resistive touch unit or the capacitive touch unit, which is an advantage of the optical touch display device 300.

It is noted that, the optical touch display device 300 includes, but not limited to, the two light emitting and receiving units 320. In another embodiment, the optical touch display device can includes one light emitting and receiving unit 320 or more than two the light emitting and receiving units 320 according to the demand. In addition, the light emitting and receiving unit 320 can further include at least one of the first reflecting member, the first refracting member, the second reflecting member and the second refracting member, as described above.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An optical touch display device, comprising:
a display panel configured for displaying an image, the display panel comprising a transparent substrate through which the image is capable of being seen, the transparent substrate comprising a touch surface and a plurality of side surfaces adjacent to the touch surface, at least one of the side surfaces being a first light incidence surface, and at least one of the side surfaces being a first light emitting surface opposite to the first light incidence surface;
at least a light emitting and receiving unit, and each light emitting and receiving unit comprising:
a linear light source disposed beside the first light incidence surface of the transparent substrate and configured for providing a plurality of optical signals into the transparent substrate through the first light incidence surface; and
a light sensing component disposed beside the first light emitting surface, the light sensing component and the linear light source being respectively disposed at two opposite sides of the transparent substrate, and the light sensing component being configured for sensing the optical signals emitted from the first light emitting surface.

2. The optical touch display device as claimed in claim 1, wherein the linear light source comprises:
a light guide plate having a second light incidence surface and a second light emitting surface adjacent to the second light incidence surface, and the second light emitting surface facing to the first light incidence surface;
a light emitting component disposed beside the second light incidence surface; and
a shell configured for receiving the light guide plate and the light emitting component, the light guide plate being configured for guiding a portion of the optical signals directly provided by the light emitting component and a portion of the optical signals reflected by the shell to the first light incidence surface.

3. The optical touch display device as claimed in claim 2, wherein the light emitting component comprises an infrared light emitting component.

4. The optical touch display device as claimed in claim 2, wherein the light emitting component comprises a light emitting diode.

5. The optical touch display device as claimed in claim 1, wherein the light sensing component comprises a complementary metal oxide semiconductor image sensor or a charge coupled device.

6. The optical touch display device as claimed in claim 1, wherein each light emitting and receiving unit further comprises a first reflecting member disposed between the light sensing component and the first light emitting surface and configured for reflecting the optical signals to the light sensing component.

7. The optical touch display device as claimed in claim 6, wherein the first reflecting member comprises a first prism, and the first prism has a third light incidence surface facing to the first light emitting surface, a third light emitting surface facing to the light sensing component and a reflecting surface adjacent to and between the third light incidence surface and the third light emitting surface.

8. The optical touch display device as claimed in claim 6, wherein each light emitting and receiving unit further comprises a first refracting member disposed between the first reflecting member and the first light emitting surface and configured for refracting the optical signals to the first reflecting member.

9. The optical touch display device as claimed in claim 1, wherein each light emitting and receiving unit further comprises a second reflecting member disposed between the linear light source and the first light incidence surface and configured for reflecting the optical signals to the first light incidence surface.

10. The optical touch display device as claimed in claim 9, wherein the second reflecting member comprises a second prism, and the second prism has a fourth light incidence surface facing to the linear light source, a fourth light emitting surface facing to the first light incidence surface and a reflecting surface adjacent to and between the fourth light incidence surface and the fourth light emitting surface.

11. The optical touch display device as claimed in claim 9, wherein each light emitting and receiving unit further comprises a second refracting member disposed between the second reflecting member and the first light incidence surface and configured for refracting the optical signals to the first light incidence surface.

12. The optical touch display device as claimed in claim 1, wherein the display panel is selected from a group consisting of a liquid crystal display panel, an eletrophoretic display panel, a plasma display panel and an organic light emitting diode display panel.

13. The optical touch display device as claimed in claim 1, further comprising two reflecting layers respectively formed on the touch surface and a surface opposite to the touch surface, wherein the reflecting layers are configured for reflecting the optical signals outside a light wavelength range of visible light.

14. The optical touch display device as claimed in claim 13, wherein the reflecting layers are configured for reflecting infrared optical signals.

15. The optical touch display device as claimed in claim 1, wherein the display panel comprises a first substrate, a second substrate and a display layer disposed between the first substrate and the second substrate, and the second substrate is the transparent substrate.

16. The optical touch display device as claimed in claim 1, wherein the optical signals provided by the linear light source are totally reflected in the transparent substrate, when a touch member touches the touch surface, a portion of the optical signals is not totally reflected due to the touch member so that a location of the touch member is sensed by the light sensing component.

17. An optical touch display device, comprising:
a display panel configured for displaying an image, and the display panel comprising a first substrate, a second substrate and a display layer disposed between the first substrate and the second substrate;

a transparent substrate disposed on the second substrate, the image being capable of being seen through the transparent substrate, the transparent substrate comprising a touch surface and a plurality of side surfaces adjacent to the touch surface, at least one of the side surfaces being a first light incidence surface, and at least one of the side surfaces being a first light emitting surface opposite to the first light incidence surface;

at least a light emitting and receiving unit, and each light emitting and receiving unit comprising:

a linear light source disposed beside the first light incidence surface of the transparent substrate and configured for providing a plurality of optical signals into the transparent substrate through the first light incidence surface; and a light sensing component disposed beside the first light emitting surface, the light sensing component and the linear light source being respectively disposed at two opposite sides of the transparent substrate, and the light sensing component being configured for receiving the optical signals emitted from the first light emitting surface.

18. The optical touch display device as claimed in claim 17, further comprising two reflecting layers respectively formed on the touch surface and a surface opposite to the touch surface, wherein the reflecting layers are configured for reflecting the optical signals outside a light wavelength range of visible light.

19. The optical touch display device as claimed in claim 18, wherein the reflecting layers are configured for reflecting the infrared optical signals.

\* \* \* \* \*